United States Patent
Kuhlthau

[11] 3,948,877
[45] Apr. 6, 1976

[54] BASIC BENZOTHIAZOLYL-AZO-QUINOLINYL DYESTUFFS

[75] Inventor: Hans-Peter Kuhlthau, Leverkusen, Germany

[73] Assignee: Bayer Aktiengesellschaft, Leverkusen, Germany

[22] Filed: Nov. 9, 1973

[21] Appl. No.: 414,291

[30] Foreign Application Priority Data
Nov. 10, 1972 Germany.......................... 2255059

[52] U.S. Cl. ......... 260/146 R; 260/155; 260/283 S; 260/287 R; 260/289 R; 260/305
[51] Int. Cl.² .. C09B 29/36; D06P 3/24; D06P 3/52; D06P 3/70
[58] Field of Search................... 260/155, 146 R

[56] References Cited
UNITED STATES PATENTS

| | | | |
|---|---|---|---|
| 2,790,791 | 4/1957 | Towne et al. | 260/158 |
| 2,839,523 | 6/1958 | Towne et al. | 260/155 |
| 2,893,816 | 7/1959 | Tsang et al. | 260/155 X |
| 3,086,002 | 4/1963 | Baumann et al. | 260/146 |
| 3,143,540 | 8/1964 | Meen et al. | 260/155 |
| 3,272,791 | 9/1966 | Moore et al. | 260/155 |
| 3,329,669 | 7/1967 | Sartori | 260/158 |
| 3,349,075 | 10/1967 | Wallace et al. | 260/158 |
| 3,585,182 | 6/1971 | Straley et al. | 260/157 |
| 3,790,557 | 2/1974 | Weaver et al. | 260/158 |
| 3,816,390 | 6/1974 | Weaver et al. | 260/158 |

FOREIGN PATENTS OR APPLICATIONS

| | | | |
|---|---|---|---|
| 1,619,328 | 2/1970 | Germany | 260/158 |

*Primary Examiner*—Floyd D. Higel
*Attorney, Agent, or Firm*—Plumley & Tyner

[57] ABSTRACT

Dyestuffs of the formula

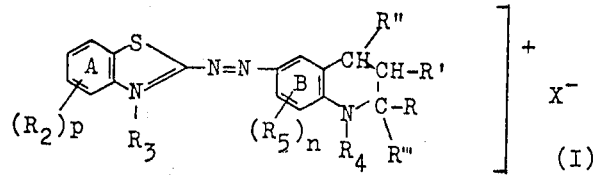

wherein
R, R', R'' and R''' denote hydrogen, methyl, ethyl or propyl, but at least two of the radicals R, R', R'' and R''' denote hydrogen,
$R_2$ denotes a non-ionic substituent,
$R_3$ denotes alkyl, alkenyl, cycloalkyl or aralkyl,
$R_4$ denotes an acyclic saturated or unsaturated unsubstituted hydrocarbon radical, halogenoalkyl, alkoxyalkyl, hydroxyalkyl, hydroxy-alkoxyalkyl, halogenohydroxyalkyl, cyanoalkyl, carboxyalkyl, aminocarbonylalkyl, acyloxyalkyl, cycloalkoxyalkyl, cycloalkenyloxyalkyl, aroyloxyalkyl, aroxyalkoxyalkyl, aralkoxyalkyl, arylthioalkyl, cycloalkyl, aralkyl, aroxyalkyl or arylaminocarbonyloxyalkyl,
$R_5$ denotes a non-ionic substituent or a carboxyl group,
p denotes the numbers 0, 1, 2, 3 or 4,
n denotes the numbers 0, 1, 2 or 3 and
$X^-$ denotes an anion.

are suitable for dyeing and printing of natural and synthetic materials, particularly of polyacrylonitrile, copolymers of acrylonitrile with other vinyl compounds, of acid modified polyesters and acid modified polyamides.

Dyestuffs of the formula I are prepared by the action of quaternising agents of the formula

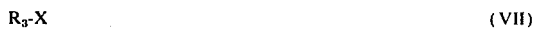 (VII)

on axo dyestuffs of the formula:

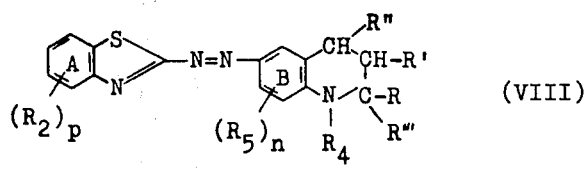

wherein R, R', R'', R''', $R_2$, $R_3$, $R_4$ and $R_5$ are as defined above.

12 Claims, No Drawings

BASIC BENZOTHIAZOLYL-AZO-QUINOLINYL DYESTUFFS

The invention relates to basic dyestuffs of the formula

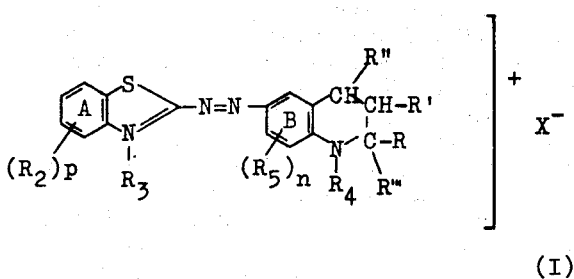

(I)

wherein
R, R', R" and R''' denote hydrogen, methyl, ethyl or propyl, but at least two of the radicals R, R', R" and R''' denote hydrogen,
$R_2$ denotes a non-ionic substituent,
$R_3$ denotes alkyl, alkenyl, cycloalkyl or aralkyl,
$R_4$ denotes an acyclic saturated or unsaturated unsubstituted hydrocarbon radical, halogenoalkyl, alkoxyalkyl, hydroxyalkyl, hydroxy-alkoxyalkyl, halogenohydroxyalkyl, cyanoalkyl, carboxyalkyl, aminocarbonylalkyl, acyloxyalkyl, cycloalkoxyalkyl, cycloalkenyloxyalkyl, aroyloxyalkyl, aroxyalkoxyalkyl, aralkoxyalkyl, arylthioalkyl, cycloalkyl, aralkyl, aroxyalkyl or arylaminocarbonyloxyalkyl,
$R_5$ denotes a non-ionic substituent or a carboxyl group,
$p$ denotes the numbers 0, 1, 2, 3 or 4,
$n$ denotes the numbers 0, 1, 2 or 3 and
$X^-$ denotes an anion.

Furthermore, mixtures of the dyestuffs I, their manufacture and their use for dyeing and printing natural and synthetic materials form a subject of this invention. The ring A can be fused to further rings. The acyclic radicals, with the exception of the radical $R_4$, and all cyclic radicals, can contain further non-ionic substituents and/or carboxyl groups.

Examples of suitable substituents of the rings A and B are: halogen, alkyl, cycloalkyl, aralkyl, hydroxyl, alkoxy, aryloxy, aralkoxy, nitro, alkoxycarbonyl, aryloxycarbonyl, aralkoxycarbonyl, carboxyl, nitrile, thiocyano, acyl, acylamino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, arylsulphonyl or trifluoromethyl.

The substituents present in one and the same ring can be identical or different.

An acyl group is understood as the radical of an aliphatic, aromatic or heterocyclic carboxylic acid or sulphonic acid.

The ring fused to the ring A is preferably a benzene ring.

An alkyl or alkenyl radical is respectively understood as a saturated or unsaturated, optionally substituted aliphatic hydrocarbon radical with, preferably, 1–6 or 2–6 C atoms respectively, such as methyl, trifluoromethyl, ethyl, chloroethyl, bromoethyl, hydroxyethyl, methoxyethyl, cyanoethyl, acetoxyethyl, aminocarbonylethyl, carboxyethyl, i-propyl, n-butyl, i-butyl, t-butyl, i-amyl, allyl, methallyl, γ-chloroallyl, propargyl, cyanomethyl, γ-cyanopropyl, β-hydroxy-n-propyl, β-hydroxy-n-butyl, β-hydroxy-i-butyl, β-hydroxy-γ-allyloxy-n-propyl or γ-methoxycarbonyl-n-butyl.

Examples of possible aralkyl radicals are: phenylmethyl, phenylethyl, β-phenyl-β-hydroxy-ethyl, phenylpropyl-(2,2) and optionally their derivatives substituted in the phenyl nucleus.

As cycloalkyl, cyclohexyl is of particular importance.

Aryl preferably represents phenyl and naphthyl and their derivatives such as 4-methylphenyl, 2-methylphenyl, 4-chlorophenyl, 2-chlorophenyl and 2-methyl-4-chlorophenyl.

Non-ionic substituents in the sense of the present invention are the substituents which are customary in dyestuff chemistry and do not dissociate under the reaction conditions in question, such as fluorine, chlorine or bromine; alkyl groups, especially straight-chain or branched alkyl radicals with 1–6 C atoms; aralkyl radicals; alkenyl radicals; aryl radicals; alkoxy radicals, especially alkoxy radicals with 1–4 C atoms; cycloalkoxy radicals; cycloalkenyloxy radicals; aralkoxy radicals; aryloxy radicals; aryloxyalkoxy radicals and alkylthio radicals, preferably alkylthio radicals with 1–3 C atoms; aralkylthio radicals; arylthio radicals and nitro; nitrile; alkoxycarbonyl, preferably with an alkoxy radical with 1–4 C atoms; the formyl radical; alkylcarbonyl radicals, especially those with an alkyl group with 1–4 C atoms; arylcarbonyl; aralkylcarbonyl radicals; arylcarbonyloxy radicals; alkylcarbonyloxy radicals; arylaminocarbonyloxy radicals; alkylaminocarbonyloxy radicals; alkoxycarbonyloxy radicals, preferably with an alkyl group with 1–4 C atoms; alkylcarbonylamino radicals, preferably with an alkyl group with 1–4 C atoms and arylcarbonylamino radicals; alkylsulphonylamino radicals, preferably with an alkyl group with 1–3 C atoms; arylsulphonylamino groups and ureido, N-aryl-ureide or N-alkylureido, aryloxycarbonylamino, alkyloxycarbonylamino, carbamoyl, N-alkyl-carbamoyl, N,N-dialkylcarbamoyl and N-alkyl-N-aryl-carbamoyl; sulphamoyl; N-alkylsulphamoyl; N,N-dialkylsulphamoyl; alkylsulphonyl; alkenylsulphonyl or aralkylsulphonyl radicals preferably with 1–4 C atoms in the alkyl radicals mentioned; arylsulphonyl, carboxylic acid alkyl ester, carboxylic acid aryl ester, sulphonic acid alkyl ester and sulphonic acid aryl ester groups.

Possible anionic radicals $X^-$ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of formic acid, acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methylbutyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyl-tetraethylene glycol-ether-propionic acid, 3-(nonyloxy)-propionic acid, 3-(isotridecyloxy)-propionic acid, 3-(isotridecyloxy)diethylene glycol-ether-propionic acid, the ether-propionic acid of the alcohol mixture with 6 to 10 carbon atoms, thioacetic acid, 6-benzoylamino-2-chlorocaproic acid, nonylphenoltetraethylene glycol-ether-propionic acid, nonylphenoldiethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-$\alpha,\alpha'$-dicarboxylic acid, methylene-bis-thioglycollic acid, dimethyl sulphide-$\alpha$-$\alpha$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$-$C_{15}$ paraffinsulphonic acid, obtained by chlorosulphonation of paraffin oil.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitroisophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-$\omega$-sulphonic acid, 2-chlorotoluene-4-sulphonic acid, 2-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do not influence it adversely are frequently also preferred.

The anion is in general decided by the manufacturing process and by the purification of the crude dyestuff which may be carried out. In general the dyestuffs are in the form of halides (especially chlorides or bromides) or methosulphates, ethosulphates, sulphates, benzenesulphonates or toluenesulphonates, or acetates. The anions can be replaced by other anions in a known manner.

Dyestuffs to be singled out are those of the general formula

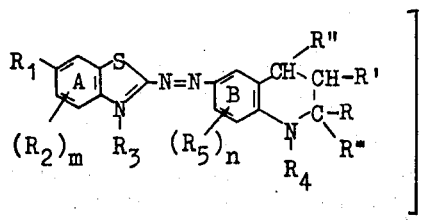

(II)

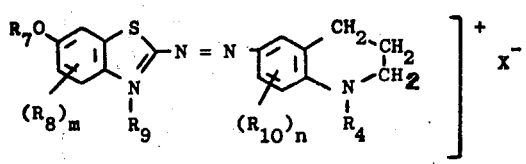

(IV)

wherein
R, R', R'' and R''' denote hydrogen, methyl, ethyl or propyl, with at least two of the radicals R, R', R'' and R''' being hydrogen,
$R_1$ denotes hydrogen, alkyl, cycloalkyl, aralkyl, alkoxy, aryloxy, aralkoxy or acylamino,
$R_2$ denotes a non-ionic substituent,
$R_3$ denotes alkyl, alkenyl, cycloalkyl or aralkyl,
$R_4$ denotes an acyclic saturated or unsaturated unsubstituted hydrocarbon radical, halogenoalkyl, alkoxyalkyl, hydroxyalkyl, hydroxy-alkoxyalkyl, halogenohydroxyalkyl, cyanoalkyl, carboxyalkyl, aminocarbonylalkyl, acyloxyalkyl, cycloalkoxyalkyl, cycloalkenyloxyalkyl, aroyloxyalkyl, aroxyalkoxyalkyl, aralkoxyalkyl, arylthioalkyl, cycloalkyl, aralkyl, aroxyalkyl or arylaminocarbonyloxyalkyl,
$R_5$ denotes a non-ionic substituent or a carboxyl group,
$m$ denotes the numbers 0, 1, 2 or 3,
$n$ denotes the numbers 0, 1, 2 or 3 and
$X^-$ denotes an anion.

Interesting dyestuffs are those of the general formula wherein
$R_4$, $m$, $n$ and $X^-$ have the abovementioned meaning and
$R_7$ represents methyl, ethyl, propyl or butyl,
$R_8$ represents methyl, ethyl, methoxy, ethoxy, chlorine, bromine, fluorine, trifluoromethyl, phenoxy or benzyloxy,
$R_9$ represents methyl, ethyl, propyl, butyl, $\beta$-chloroethyl, $\beta$-cyanoethyl, $\beta$-bromoethyl, $\beta$-acetoxyethyl, allyl, benzyl, $\beta$-carboxyethyl or $\beta$-carbonamidoethyl and
$R_{10}$ represents methyl, ethyl, methoxy, ethoxy, fluorine, chlorine, bromine, trifluoromethyl, nitrile, thiocycanato, nitro, carboxyl, aminocarbonyl, aminosulphonyl, acetyl, benzoyl, phenoxy, benzyloxy, carboxylic acid methyl ester, ethyl ester, phenyl ester or benzyl ester, methylsulphonyl, ethylsulphonyl or phenylsulphonyl.

Amongst those of the formula IV, dyestuffs in which $R_4$ represents $\beta$-hydroxyethyl, $\beta$-chloroethyl, n-butyl or benzyl,
$R_7$ represents $CH_3$ or $C_2H_5$,
$R_9$ represents $CH_3$ and
$m$ and $n$ represent the number 0
should be singled out.

Further valuable dyestuffs are those of the general formula

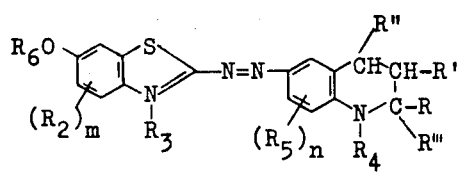

(III)

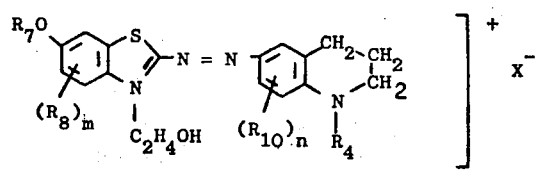

(V)

wherein
R, R', R'', R''', $R_2$, $R_3$, $R_4$, $R_5$, $m$, $n$ and $X^-$ have the meaning mentioned in connection with the formula I or the formula II and
$R_6$ represents an alkyl group.

Dyestuffs of particular importance are those of the general formula

Herein
$R_4$, $R_7$, $R_8$, $R_{10}$, $m$, $n$ and $X^-$ have the abovementioned meaning.

In dyestuffs of the formula V of very particular interest
$R_7$ represents $-CH_3$ or $-C_2H_5$ and
$m$ and $n$ represent the number 0.

Further dyestuffs of particular interest are those of the general formula

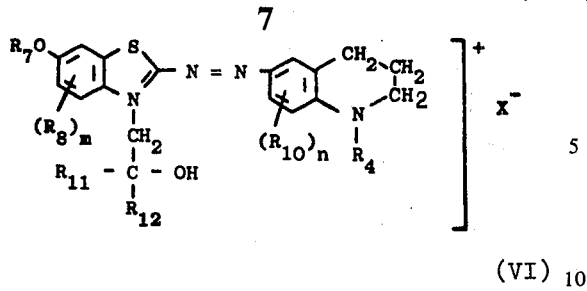

(VI)

wherein $R_4$, $R_7$, $R_8$, $R_{10}$, m, n and $X^-$ have the abovementioned meaning and $R_{11}$ represents hydrogen or methyl and $R_{12}$ represents methyl, ethyl, chloromethyl, methoxymethyl, ethoxymethyl, propoxymethyl, butoxymethyl, allyloxymethyl, phenoxymethyl or phenyl.

In examples of the formula VI which are of very particular importance $R_7$ represents —$CH_3$ or —$C_2H_5$, $R_{11}$ represents hydrogen and m and n represent the number 0.

Dyestuffs of the formula I are manufactured by the action of quaternising agents of the formula

on azo dyestuffs of the formula

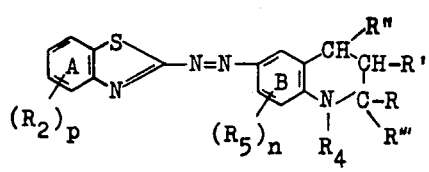

(VIII)

in a manner which is in itself known. Herein

X denotes a radical which can be split off as an anion and

R, R', R'', R''', $R_2$ to $R_5$, p, n and A have the abovementioned meaning.

Examples of suitable quaternising compounds are alkyl halides, alkenyl halides, aralkyl halides, cycloalkyl halides, dialkyl sulphates, alkyl esters of arylsulphonic acids and other esters of strong mineral acids and organic sulphonic acids and preferably lower alcohols. The quaternising agents can be substituted further as, for example, in the case of bromopropionic acid amide or bromopropionitrile. The action of these compounds of the formula VII can take place with or without addition of a further solvent or in aqueous suspension, at temperatures of 5°–100°C, preferably at 15°–90°C. The presence of a basic material such as, for example, magnesium oxide, alkali metal carbonate, alkali metal bicarbonate, alkaline earth carbonate, potassium acetate or mixtures of such basic materials may be indicated. Examples of suitable solvents are halogenobenzenes, benzene hydrocarbons, dialkylketones, halogenoalkanes (such as, say, carbon tetrachloride, tetrachloroethylene or chloroform), nitrobenzene, dimethylformamide, glacial acetic acid or alcohols.

The alkylation of azo dyestuffs of the formula VIII to give basic dyestuffs of the formula I can also be achieved by the action of acrylic acid or its derivatives, for example of acrylamide, in the presence of an organic or inorganic acid which yields the anion $X^-$, at temperatures between 50° and 100°C. Examples of suitable acids are acetic acid, formic acid, hydrochloric acid or their mixtures. The quaternisation of azo dyestuffs of the formula VIII to give dyestuffs of the formula I can also be effected by the action of ethylene oxide or of an epoxy compound of the formula

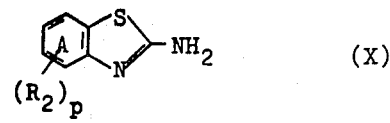

(IX)

wherein $R_{11}$ and $R_{12}$ have the abovementioned meaning. This reaction takes place using a solvent, in the presence of an organic or inorganic acid, at temperatures of 10°–100°C, preferably at 40°–90°C. Examples of suitable acids are sulphuric acid, phosphoric acid, hydrochloric acid, hydrobromic acid, benzenesulphonic acid, toluenesulphonic acid, formic acid, acetic acid or propionic acid, and the liquid fatty acids can at the same time be used as solvents. Examples of further suitable solvents are dimethylformamide, acetonitrile, dioxane, tetrahydrofurane, halogenobenzene, benzene hydrocarbons, nitrobenzene and dialkylketones.

Compounds of the formula VIII are obtained in a manner which is in itself known if 2-aminobenzthiazoles of the formula

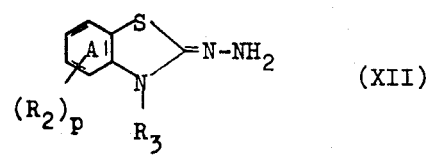

(X)

wherein $R_2$, p and A have the meaning indicated for the formula I are diazotised and then coupled to tetrahydroquinolines of the formula

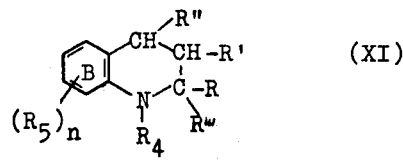

(XI)

Herein

R, R', R'', R''', $R_4$, $R_5$, n and B have the abovementioned meaning.

Dyestuffs of the formula I can furthermore be manufactured by oxidatively coupling hydrazones of the formula

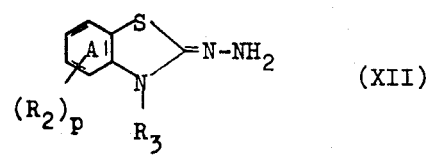

(XII)

to tetrahydroquinolines of the formula XI.

In the formula XII, R$_2$, R$_3$, p and A have the meaning indicated in relation to the formula I.

Examples of suitable benzthiazoles of the formula X are: 2-amino-6-methoxy-benzthiazole, 2-amino-6-ethoxy-benzthiazole, 2-amino-6-methoxy-4-methyl-benzthiazole, 2-amino-5,6-dimethoxy-benzthiazole, 2-amino-4,6-dimethoxy-benzthiazole, 2-amino-5-methyl-6-methoxy-benzthiazole, 2-amino-6-(α-ethyl-capronyl-amino)-benzthiazole, 2-amino-benzthiazole, 2-amino-6-benzoylamino-benzthiazole, 2-amino-6-acetylaminobenzthiazole, 2-amino-6-butoxy-benzthiazole, 2-amino-6-propoxy-benzthiazole and 2-amino-6-methylbenzthiazole.

Examples of suitable tetrahydroquinolines of the formula XI are: N-methyl-tetrahydroquinoline, N-ethyl-tetrahydroquinoline, N-n-propyl-tetrahydroquinoline, N-n-butyltetrahydroquinoline, N-allyl-tetrahydroquinoline, N-benzyltetrahydroquinoline, N-2'-chlorobenzyl-tetrahydroquinoline, N-4'-chlorobenzyl-tetrahydroquinoline, N-4'-methylbenzyltetrahydroquinoline, N-cyanomethyl-tetrahydroquinoline, N-β-cyanoethyl-tetrahydroquinoline, N-β-hydroxyethyl-tetrahydroquinoline, N-β-chloroethyl-tetrahydroquinoline, N-β-bromoethyl-tetrahydroquinoline, N-β-methoxyethyl-tetrahydroquinoline, N-β-acetoxyethyl-tetrahydroquinoline, N-β-hydroxy-n-propyl-tetrahydroquinoline, N-β-hydroxy-n-butyl-tetrahydroquinoline, N-β-hydroxy-i-butyl-tetrahydroquinoline, N-β-hydroxy-γ-methoxy-propyl-tetrahydroquinoline, N-β-hydroxy-γ-ethoxy-propyl-tetrahydroquinoline, N-β-hydroxy-γ-propoxypropyl-tetrahydroquinoline, N-β-hydroxy-γ-butoxy-propyl-tetrahydroquinoline, N-β-hydroxy-γ-allyloxy-propyl-tetrahydroquinoline, N-β-hydroxy-γ-phenoxy-propyl-tetrahydroquinoline and N-β-hydroxy-β-phenylethyl-tetrahydroquinoline, N-β-n-amyloxy-ethyl-tetrahydroquinoline, N-β-n-butyloxy-ethyl-tetra hydroquinoline, N-β-tert-butyloxy-ethyl-tetrahydroquinoline, N-β-cyclohexyloxy-ethyl-tetrahydroquinoline, N-β-benzoyloxy-ethyl-tetrahydroquinoline, N-β-(p-methoxybenzoyloxy)-ethyl-tetrahydroquinoline, N-β-(p-methoxycarbonyl-benzoyloxy)-ethyl-tetrahydroquinoline, N-β-phenoxy-ethyl-tetrahydroquinoline, N-β-benzyl-oxyethyl-tetrahydroquinoline, N-β-(β'-phenylethyloxy)-ethyl-tetrahydroquinoline, N-β-(γ'-phenylpropoxy)-ethyl-tetrahydroquinoline, N-β-(β'-phenyloxyethyloxy)-ethyl-tetrahydroquinoline, N-β-(p-chlorophenoxy)-ethyl-tetrahydroquinoline, N-β-(p-chlorobenzyloxy)-ethyl-tetrahydroquinoline, N-β-(o-chlorophenoxy)-ethyl-tetrahydroquinoline, N-β-(p-methylphenoxy)-ethyl-tetrahydroquinoline, N-β-(o-methylphenoxy)-ethyl-ttetrahydroquinoline, N-β-(p-ethylphenoxy)-ethyl-tetrahydroquinoline, N-β-(o-ethylphenoxy)-ethyl-tetrahydroquinoline, N-β-(m-methylphenoxy)-ethyl-tetrahydroquinoline, N-β-(p-cyclohexyl-phenoxy)-ethyl-tetrahydroquinoline, N-β-(β'-naphthoxy)-ethyl-tetrahydroquinoline, N-β-(o-isopropyloxy-phenoxy)-ethyl-tetrahydroquinoline, N-β-(o,p-dichlorophenoxy)-ethyltetrahydroquinoline, N-β-(p-phenylphenoxy)-ethyltetrahydroquinoline, N-β-(o-benzylphenoxy)-ethyltetrahydroquinoline, N-β-(p-benzylphenoxy)-ethyltetrahydroquinoline, N-β-(p-tert-butylphenoxy)-ethyltetrahydroquinoline, N-β-phenylthio-ethyl-tetrahydroquinoline, N-β-pentachlorophenylthio-ethyl-tetrahydroquinoline, N-β-(p-chloro-m-methylphenoxy)-ethyl-tetrahydroquinoline, N-β-(p-methoxy-phenoxy)-ethyltetrahydroquinoline, N-β-(3,5-dimethylphenoxy)-ethyl-tetrahydroquinoline, N-β-(3,5-dimethyl-4-chlorophenoxy)-ethyl-tetrahydroquinoline, N-β-(o-isopropyl-phenoxy)-ethyl-tetrahydroquinoline, N-β-[p-(2-phenylisopropyl)-phenoxy]-ethyl-tetrahydroquinoline, N-β-(1,2,3,4-tetrahydronaphth-(6)-oxy)-ethyl-tetrahydroquinoline, N-β-(1,2,3,4-tetrahydronaphth-(1)-oxy)-ethyl-tetrahydroquinoline, N-β-(phenylamino-carbonyloxy)-ethyl-tetrahydroquinoline.

The new dyestuffs of the formula I are valuable dyestuffs which can be used for dyeing and printing materials of leather, tannin-treated cotton, cellulose, synthetic high molecular polyamides and high molecular polyurethanes, and for dyeing fibres containing lignin, such as coir, jute and sisal. They are furthermore suitable for the manufacture of writing fluids, rubber stamp inks and ball pen pastes, and can also be used in flexographic printing.

Materials which are particularly suitable for dyeing with the basic dyestuffs of the formula I are flocks, fibres, filaments, tapes, woven fabrics or knitted fabrics of polyacrylonitrile or polyvinylidene cyanide or of copolymers of acrylonitrile with other vinyl compounds, such as vinyl chloride, vinylidene chloride, vinyl fluoride, vinyl acetate, vinylpyridine, vinylimidazole, vinyl alcohol, acrylic acid esters and amides and methacrylic acid esters and amides, or flocks, fibres, filaments, tapes, woven fabrics or knitted fabrics of acid-modified aromatic polyesters and acid-modified polyamides. Examples of acid-modified aromatic polyesters are polycondensation products of sulphoterephthalic acid and ethylene glycol, that is to say polyethylene glycol terephthalates containing sulphonic acid groups (type Dacron 64 of E.I. DuPont de Nemours and Company), such as are described in Belgian Patent Specification No. 549,179 and U.S. Pat. No. 2,893,816.

Dyeing can be carried out from a weakly acid liquor, in which case the material is appropriately introduced into the dyebath at 40°–60°C and then dyed at the boil. Dyeing under pressure at temperatures above 100°C is also possible. Further, the dyestuffs can be added to spinning solutions for the manufacture of fibres containing polyacrylonitrile or be applied to the fibre before stretching.

The dyestuffs according to the invention, and their mixtures, are very suitable for dyeing mouldings of polymers or copolymers of acrylonitrile, asymmetrical dicyanoethylene and acid-modified aromatic polyesters in chlorinated hydrocarbons as the dyebath, provided they carry substituents which assist the solubility in chlorinated hydrocarbons such as, for example, the tertiary butyl group or the dodecyloxy group, or provided the anion X$^-$ is the anion of a monobasic organic acid with 4–30 carbon atoms.

EXAMPLE 1

18 g of 2-amino-6-methoxybenzthiazole are dissolved in a mixture of 120 ml of glacial acetic acid and 60 ml of water. 29 ml of 48% strength sulphuric acid are then added and the amount of nitrosylsulphuric acid corresponding to 7 g of sodium nitrite is added dropwise at −5°C. After stirring for a further hour at this temperature, 1 g of amidosulphonic acid is added and the resulting diazonium salt solution is added dropwise to a mixture of 250 g of ice, 50 ml of water, 20 ml of 48% strength sulphuric acid and 17.7 g of N-hydroxyethyl-tetrahydroquinoline. The mixture is stirred for a further hour at approx. −10°C and is then neutralised to pH 4 by dropwise addition of 20% strength sodium hydroxide solution. In the course thereof, the temperature is kept at below 0°.

After completion of coupling, the azo dyestuff is filtered off, washed with water and dried in vacuo. The resulting black-violet powder is stirred into 100 ml of chloroform and 18 g of dimethyl sulphate are added dropwise at the boiling point of the chloroform. The mixture is then stirred for a further 30 minutes under reflux cooling and 300 ml of boiling water are subsequently introduced. In the course thereof, the chloroform distils off. 40 g of sodium chloride and 5 g of zinc chloride are added to the resulting solution at 50°, the mixture is cooled and the dyestuff which crystallises out is filtered off and dried in vacuo. It has the formula

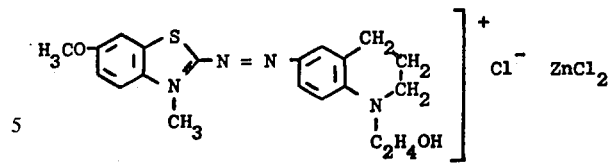

and dyes polyacrylonitrile fibres in a blue colour shade of good fastness to light and to wet processing. The dyestuff is distinguished by very good resistance to boiling.

The dyestuff can also be prepared by carrying out the quaternisation with p-toluenesulphonic acid methyl ester or with methyl iodide, instead of with dimethyl sulphate.

Valuable dyestuffs are also obtained if the following 2-aminobenzthiazoles are coupled with the indicated tetrahydroquinolines in the manner described and the azo dyestuff is freed of acid and methylated with dimethyl sulphate. The dyeings which the dyestuffs give on Dralon have the colour shade shown:

| 2-Aminobenzthiazole | Tetrahydroquinoline | Colour shade on polyacrylonitrile |
|---|---|---|
| 6-methoxy- | 1-n-butyl-tetrahydroquinoline | Blue |
| 6-ethoxy- | 1-β-hydroxyethyl-tetrahydroquinoline | " |
| 6-methoxy- | 1-benzyl-tetrahydroquinoline | " |
| 6-ethoxy- | " | " |
| 6-ethoxy- | 1-n-butyl-tetrahydroquinoline | " |
| 6-methoxy- | 1-β-chloroethyl-tetrahydroquinoline | " |
| 6-ethoxy- | " | " |
| 6-methoxy- | 1-β-acetoxyethyl-tetrahydroquinoline | " |
| 6-ethoxy- | " | " |
| 6-methoxy- | 1-allyl-tetrahydroquinoline | " |
| 6-ethoxy- | " | " |
| 6-methoxy- | 1-β-cyanoethyl-tetrahydroquinoline | " |
| 6-ethoxy- | " | " |
| 6-methoxy- | 1-cyanomethyl-tetrahydroquinoline | reddish-tinged blue |
| " | 1-β-methoxyethyl-tetrahydroquinoline | blue |
| " | 1-β-hydroxy-n-propyl-tetrahydroquinoline | " |
| " | 1-β-hydroxy-n-butyl-tetrahydroquinoline | " |
| " | 1-β-hydroxy-β-phenylethyl-tetrahydroquinoline | " |
| " | 1-n-propyl-tetrahydroquinoline | " |
| " | 1-β-bromoethyl-tetrahydroquinoline | " |
| " | 1-β-hydroxy-γ-allyloxy-n-propyl-tetrahydroquinoline | " |
| " | 1-β-hydroxy-γ-methoxy-n-propyl-tetrahydroquinoline | " |
| " | 1-β-hydroxy-γ-ethoxy-n-propyl-tetrahydroquinoline | " |
| " | 1-β-hydroxy-γ-chloro-n-propyl-tetrahydroquinoline | " |
| 6-ethoxy- | " | " |
| 6-methoxy- | 1-(4'-chlorobenzyl)-tetrahydroquinoline | " |
| " | 1-(2'-chlorobenzyl)-tetrahydroquinoline | " |
| " | 1-(4'-methylbenzyl)-tetrahydroquinoline | " |
| " | 1-isopropyl-tetrahydroquinoline | " |
| 6-benzoylamino- | 1-benzyl-tetrahydroquinoline | " |
| 6-benzoylamino | 1-β-hydroxyethyl-tetrahydroquinoline | " |
| 6-acetylamino- | 1-benzyl-tetrahydroquinoline | " |
| 6-(α-ethyl-capronyl)-amino | 1-β-hydroxyethyl-tetrahydroquinoline | " |
| 6-methoxy-4-methyl- | 1-β-hydroxyethyl-tetrahydroquinoline | " |
| 6-methoxy-4-methyl- | 1-benzyl-tetrahydroquinoline | " |
| 5,6-dimethoxy- | 1-β-hydroxyethyl-tetrahydroquinoline | " |
| 4,6-dimethoxy- | 1-β-hydroxyethyl-tetrahydroquinoline | " |
| 6-methoxy- | 1-β-hydroxy-γ-phenoxy-n-propyl-tetrahydroquinoline | " |
| 6-methyl- | 1-benzyl-tetrahydroquinoline | " |
| Mixture of 5-methyl-6-methoxy- and 7-methyl-6-methoxy- | 1-β-hydroxyethyl-tetrahydroquinoline | " |
| 6-propoxy- | " | " |
| 6-butoxy- | " | " |
| 2-aminobenzthiazole | " | " |
| 6-benzyloxy- | " | " |
| 6-tert.-butyl- | " | " |
| 6-methyl- | " | " |
| 6-benzyl- | " | " |
| 4,6,7-trimethyl- | " | " |
| 4,6-dimethyl- | " | " |
| 6-ethyl- | 1-β-hydroxyethyl-tetrahydroquinoline | " |
| 6-methoxy- | 1-cyclohexyltetrahydroquinoline | " |
| 6-ethoxy- | " | " |
| 6-methoxy- | 1-β-hydroxyethyl-2-methyl-tetrahydroquinoline | " |
| " | 1-β-hydroxyethyl-7-methyl-tetrahydroquinoline | " |

| 2-Aminobenzthiazole | Tetrahydroquinoline | Colour shade on polyacrylonitrile |
|---|---|---|
| | 1-β-hydroxyethyl-4-methyl-tetrahydroquinoline | " |
| " | 1-β-hydroxyethyl-2-ethyl-tetrahydroquinoline | " |
| " | 1-β-hydroxyethyl-2,3-dimethyl-tetrahydroquinoline | " |
| " | 1-β-hydroxyethyl-2,8-dimethyl-tetrahydroquinoline | " |
| " | 1-β-hydroxyethyl-5,8-dimethyl-tetrahydroquinoline | " |
| " | 1,2,2-trimethyl-tetrahydroquinoline | |
| " | 1-β-hydroxyethyl-2,4-dimethyl-tetrahydroquinoline | " |
| " | 1-β-hydroxyethyl-4,8-dimethyl-tetrahydroquinoline | " |
| " | 1-β-hydroxyethyl-4,7-dimethyl-tetrahydroquinoline | " |
| " | 1-β-hydroxyethyl-3-methyl-tetrahydroquinoline | " |
| " | 1-β-hydroxyethyl-2,7-dimethyl-tetrahydroquinoline | " |
| " | 1-β-chloroethyl-2,7-dimethyl-tetrahydroquinoline | " |
| " | 1-β-hydroxyethyl-2,4,7-trimethyl-tetrahydroquinoline | " |
| " | 1-methyl-7-nitro-tetrahydroquinoline | " |
| " | 1-β-(N-phenyl-aminocarbonyloxy)-ethyl-tetrahydroquinoline | |
| " | N-β-n-amyloxy-ethyl-tetrahydroquinoline, | " |
| " | N-β-n-butyloxy-ethyl-tetrahydroquinoline, | " |
| " | N-β-tert-butyloxy-ethyl-tetrahydroquinoline, | " |
| " | N-β-cyclohexyloxy-ethyl-tetrahydroquinoline, | " |
| " | N-β-benzoyloxy-ethyl-tetrahydroquinoline, | " |
| " | N-β-(p-methoxybenzoyloxy)-ethyl-tetrahydroquinoline, | " |
| " | N-β-(p-methoxycarbonyl-benzoyloxy)-ethyl-tetrahydroquinoline; | " |
| " | N-β-phenoxy-ethyl-tetrahydroquinoline, | " |
| " | N-β-benzyl-oxy-ethyl-tetrahydroquinoline, | " |
| " | N-β-(β'-phenyl-ethyloxy)-ethyl-tetrahydroquinoline, | " |
| " | N-β-(γ'-phenylpropoxy)-ethyl-tetrahydroquinoline, | " |
| " | N-β-(β'-phenyloxyethyloxy)-ethyl-tetrahydroquinoline, | " |
| " | N-β-(p-chlorophenoxy)-ethyl-tetrahydroquinoline, | " |
| " | N-β-(p-chlorobenzyloxy)-ethyl-tetrahydroquinoline, | " |
| " | N-β-(o-chlorophenoxy)-ethyl-tetrahydroquinoline, | " |
| " | N-β-(p-methylphenoxy)-ethyl-tetrahydroquinoline, | " |
| " | N-β-(o-methylphenoxy)-ethyl-tetrahydroquinone, | " |
| " | N-β-(p-ethylphenoxy)-ethyl-tetrahydroquinoline, | " |
| " | N-β-(o-ethylphenoxy)-ethyl-tetrahydroquinoline, | " |
| " | N-β-(m-methylphenoxy)-ethyl-tetrahydroquinoline, | " |
| " | N-β-(p-cyclohexyl-phenoxy)-ethyl-tetrahydroquinoline, | " |
| " | N-β-(β'-naphthoxy)-ethyl-tetrahydroquinoline, | " |
| " | N-β-(o-isopropyloxyphenoxy)-ethyl-tetrahydroquinoline, | " |
| " | N-β-(o,p-dichlorophenoxy)-ethyl-tetrahydroquinoline, | " |
| " | N-β-(p-phenylphenoxy)-ethyl-tetrahydroquinoline, | " |
| " | N-β-(o-benzylphenoxy)-ethyl-tetrahydroquinoline, | " |
| " | N-β-(p-benzylphenoxy)-ethyl-tetrahydroquinoline, | " |
| " | N-β-(p-tert-butylphenoxy)-ethyl-tetrahydroquinoline, | " |
| " | N-β-phenylthio-ethyl-tetrahydroquinoline, | " |
| " | N-β-pentachlorophenylthio-ethyl-tetrahydroquinoline, | " |
| " | N-β-(p-chloro-m-methylphenoxy)-ethyl-tetrahydroquinoline, | " |
| " | N-β-(p-methoxy-phenoxy)-ethyl-tetrahydroquinoline, | " |
| " | N-β-(3,5-dimethylphenoxy)-ethyl-tetrahydroquinoline, | " |
| " | N-β-(3,5-dimethyl-4-chlorophenoxy)-ethyl-tetrahydroquinoline, | " |
| " | N-β-(o-isopropyl-phenoxy)-ethyl-tetrahydroquinoline, | " |
| " | N-β-[p-(2-phenylisopropyl)-phenoxy]-ethyl-tetrahydroquinoline, | " |
| " | N-β-(1,2,3,4-tetrahydronaphth-(6)-oxy)-ethyl-tetrahydroquinoline, | " |
| " | N-β-(1,2,3,4-tetrahydronaphth-(1)-oxy)-ethyl-tetrahydroquinoline, | " |
| " | N-β-(phenylamino-carbonyloxy)-ethyl-tetrahydroquinoline, | " |

EXAMPLE 2

If the procedure in Example 1 is followed but instead of dimethyl sulphate the equivalent amount of diethyl sulphate is employed, in which case it is desirable to extend the period of alkylation to 6 hours, the dyestuff of the formula:

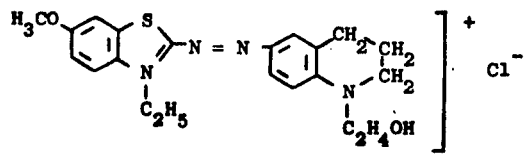

is obtained. It is distinguished by very good stability to boiling and dyes polyacrylonitrile in a blue colour shade. Similarly good results are obtained if, in the manufacture of the dyestuffs mentioned in the table accompanying Example 1, diethyl sulphate is used instead of dimethyl sulphate.

EXAMPLE 3

20 g of the azo dyestuff described in Example 1, which have not been reacted with dimethyl sulphate, are stirred with 30 ml of acetonitrile and 30 ml of n-butyl bromide, 1 g of magnesium oxide is added and the mixture is heated to 80°–85° for 12 hours. The solvents are then distilled off in the vacuum of a water pump. The distillation residue is dissolved in hot water and clarified with 3 g of active charcoal. The product is then precipitated with sodium chloride and the dyestuff is separated from the solution and dried in vacuo. The reaction product has the formula

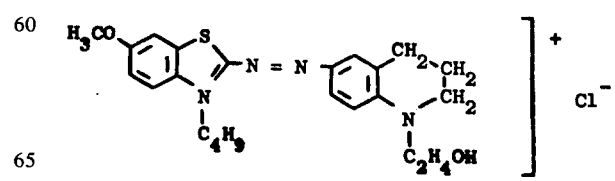

It dyes polyacrylonitrile in a blue colour shade.

EXAMPLE 4

22.3 g of N-benzyl-tetrahydroquinoline are added dropwise over the course of 1 hour at −10°C to a diazonium salt solution from 18 g of 2-amino-6-methoxybenzthiazole which has been prepared as described in Example 1, the mixture is stirred for a further 30 minutes and 300 g of ice are then added.

Hereupon, the acid salt of the azo dyestuff crystallises. After stirring for a further 5 hours at 0°C, the salt is filtered off, washed with water and again stirred with 300 ml of water. Sodium hydroxide solution is then added dropwise until a pH value of 8 persists and the product is squeezed out, washed with water and dried in vacuo. The dried product is stirred with 50 ml of glacial acetic acid at 50°C. Ethylene oxide is then passed in and the temperature is slowly raised to 80°C. As soon as the quaternisation, which can readily be followed in a thin layer chromatogram, is complete, the solution is stirred into 250 ml of 20% strength sodium chloride solution, the whole is stirred for a few minutes longer and the dyestuff which has crystallised is then squeezed out. It is dried in vacuo and is obtained in quantitative yield. The product has the formula:

It dyes polyacrylonitrile in a blue colour shade.

EXAMPLE 5

If the procedure indicated in Example 4 is followed and instead of ethylene oxide 12.5 g of 1,2-butylene oxide are added, the analogous working up yields the dyestuff of the formula

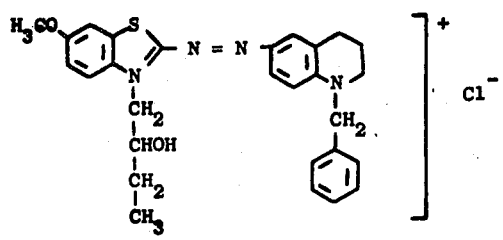

which also dyes polyacrylonitrile in a blue colour having good fastness properties.

Valuable dyestuffs are also obtained if the procedure in Examples 4 and 5 is followed but the 2-aminobenzthiazoles and tetrahydroquinolines listed in the table which follows are reacted with one another and then quaternised with the epoxides mentioned. The dyeing of the dyestuffs of the examples on polyacrylonitrile gives the colour shades which are also indicated.

| 2-aminobenz-thiazole | Tetrahydroquinoline | Quaternised with | Colour shade on polyacrylonitrile |
| --- | --- | --- | --- |
| 6-methoxy- | 1-β-hydroxyethyl-tetrahydroquinoline | ethylene oxide | blue |
| " | 1-n-butyl-tetrahydroquinoline | " | " |
| 6-ethoxy- | 1-benzyl-tetrahydroquinoline | " | " |
| 6-methoxy- | 1-p-chlorobenzyl-tetrahydroquinoline | " | " |
| " | 1-o-chlorobenzyl-tetrahydroquinoline | " | " |
| " | 1-p-methylbenzyl-tetrahydroquinoline | " | " |
| " | N-methyltetrahydroquinoline | " | " |
| " | 1-allyl-tetrahydroquinoline | " | " |
| " | 1-β-chloroethyl-tetrahydroquinoline | " | " |
| " | 1-β-hydroxy-n-butyl-tetrahydroquinoline | " | " |
| " | 1-β-hydroxy-γ-chloro-n-propyl-tetrahydroquinoline | " | " |
| " | 1-benzyl- " | propylene oxide | " |
| " | 1-β-hydroxyethyl- " | " | " |
| " | 1-β-hydroxyethyl- " | γ-phenoxypropylene oxide | " |
| " | 1-benzyl- " | " | " |
| " | 1-β-hydroxyethyl- " | γ-allyloxypropylene oxide | " |
| " | 1-benzyl- " | " | " |
| " | 1-β-hydroxyethyl-n-propyl | 1,2-butylene oxide | " |
| " | 1-β-hydroxyethyl-n-propyl | γ-methoxypropylene oxide | " |
| " | 1-benzyl-n-propyl | " | " |
| " | 1-β-hydroxyethyl-n-propyl | γ-ethoxypropylene oxide | " |
| " | 1-benzyl-n-propyl | " | " |
| " | 1-β-hydroxyethyl-n-propyl | γ-butoxypropylene oxide | " |
| " | 1-benzyl-n-propyl | " | " |
| " | 1-cyanoethyl-n-propyl | 1,2-butylene oxide | " |
| " | " | ethylene oxide | " |
| " | " | propylene oxide | " |
| " | 1-β-acetoxyethyl-n-propyl | " | " |
| " | 1-β-acetoxyethyl-tetrahydroquinoline | 1,2-butylene oxide | " |
| " | 1-butyl-tetrahydroquinoline | " | " |
| " | " | propylene oxide | " |
| " | 1-β-hydroxyethyl-tetrahydroquinoline | epichlorohydrin | " |
| " | 1-β-chloroethyl-tetrahydroquinoline | " | " |
| 6-methyl-6-methoxy- | 1-benzyl-tetrahydroquinoline | 1,2-butylene oxide | " |
| | 1-β-(phenylamino-carbonyloxy)-ethyl-tetrahydroquinoline | ethylene oxide | " |
| " | 1-methyl-7-nitro-tetrahydroquinoline | " | " |

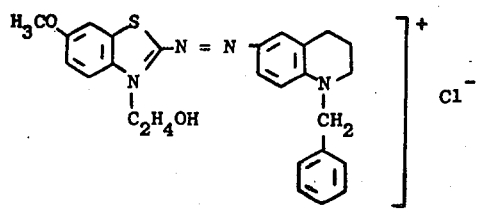

EXAMPLE 6

A polyacrylonitrile fabric is printed with a printing paste which was manufactured in the following manner: 30 parts by weight of the dyestuff described in Example 1, 50 parts by weight of thiodiethylene glycol, 30 parts by weight of cyclohexanol and 30 parts by weight of 30% strength acetic acid are covered with 330 parts by weight of hot water and the resulting solution is added to 500 parts by weight of crystal gum (gum arabic as the thickener). Finally, 30 parts by weight of zinc nitrate solution are also added. The resulting print is dried, steamed for 30 minutes and subsequently rinsed. A blue print of very good fastness properties is obtained.

EXAMPLE 7

Acid-modified polyglycol terephthalate fibres are introduced, using a liquor ratio of 1:40, into an aqueous bath at 20°C, which contains, per liter, 3 to 10 g of sodium sulphate, 0.1 to 1 g of oleyl polyglycol ether (50 mols of ethylene oxide), 0-15 g of dimethyl-benzyl-dodecylammonium chloride and 0.15 g of the dyestuff described in the 1st position of the table accompanying Example 1, and which has been adjusted to pH 4 to 5 with acetic acid. The bath is heated to 100°C over the course of 30 minutes and is kept at this temperature for 60 minutes. Thereafter the fibres are rinsed and dried. A blue dyeing having good fastness properties is obtained.

EXAMPLE 8

Polyacrylonitrile fibres are introduced, using a liquor ratio of 1:40, into an aqueous bath at 40°C which contains, per liter, 0.75 g of 30% strength acetic acid, 0.38 g of sodium acetate and 0.15 g of the dyestuff described in Example 1. The bath is heated to the boil over the course of 20–30 minutes and is kept at this temperature for 30–60 minutes. After rinsing and drying, a blue dyeing having very good fastness properties is obtained.

EXAMPLE 9

A stock solution is prepared from 15 parts by weight of the dyestuff mentioned in Example 1, 15 parts by weight of polyacrylonitrile and 70 parts by weight of dimethylformamide and is added to a customary polyacrylonitrile spinning solution which is spun in a known manner. A blue dyeing having very good fastness properties is obtained.

EXAMPLE 10

Acid-modified synthetic polyamide fibres are introduced, using a liquor ratio of 1:40, into an aqueous bath at 40°C which contains, per liter, 10 g of sodium acetate, 1 to 5 g of oleyl polyglycol ether (50 mols of ethylene oxide) and 0.3 g of the dyestuff described in Example 1 and which has been adjusted to pH 4–5 with acetic acid. The bath is heated to 98°C over the course of 30 minutes and is kept at this temperature. Thereafter the fibres are rinsed and dried. A blue dyeing is obtained.

I claim:
1. Dyestuff of the formula

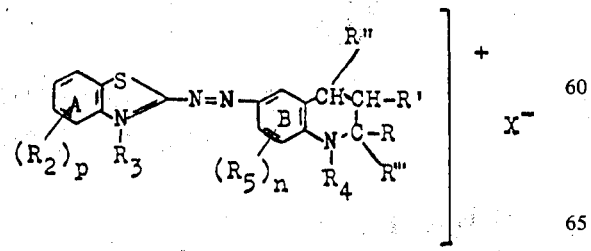

wherein
R, R', R'' and R''' are hydrogen, methyl, ethyl or propyl, at least two of which are hydrogen;
$R_2$ and $R_5$ are halogen, $C_1$-$C_6$-alkyl, chloro-$C_1$-$C_6$-alkyl, bromo-$C_1$-$C_6$-alkyl, hydroxy-$C_1$-$C_6$-alkyl, methoxy-$C_1$-$C_6$-alkyl, cyano-$C_1$-$C_6$-alkyl, acetoxy-$C_1$-$C_6$-alkyl, aminocarbonyl-$C_1$-$C_6$-alkyl, carboxy-$C_1$-$C_6$-alkyl, allyloxy-$C_1$-$C_6$-alkyl, methoxycarbonyl-$C_1$-$C_6$-alkyl, cyclohexyl, phenylmethyl, phenylethyl, $\beta$-phenyl-$\beta$-hydroxyethyl, phenylpropyl-(2,2), hydroxyl, $C_1$-$C_6$-alkoxy, phenyloxy, naphthyloxy, 4-methylphenyloxy, 2-methylphenyloxy, 4-chlorophenyloxy, 2-chlorophenyloxy, 2-methyl-4-chlorophenyloxy, phenylmethyloxy, phenylethyloxy, $\beta$-phenyl-$\beta$-hydroxyethyloxy, phenylpropyl-(2,2)-oxy, nitro, $C_1$-$C_6$-alkoxycarbonyl, phenyloxycarbonyl, naphthyloxycarbonyl, 4-methylphenyloxycarbonyl, 2-methylphenyloxycarbonyl, 4-chlorophenyloxycarbonyl, 2-chlorophenyloxycarbonyl, 2-methyl-4-chlorophenyloxycarbonyl, phenylmethyloxycarbonyl, phenylethyloxycarbonyl, $\beta$-phenyl-$\beta$-hydroxy-ethyloxycarbonyl, phenylpropyl-2,2-oxycarbonyl, carboxyl, nitrilo, thiocyano, $\beta$-ethyl-capronyl-amino, benzoylamino, acetylamino, carbamoyl, N-($C_1$-$C_6$-alkyl)carbamoyl, N,N-di-($C_1$-$C_6$-alkyl)dicarbamoyl, N-($C_1$-$C_6$-alkyl)-N-phenylcarbamoyl, N-($C_1$-$C_6$-alkyl)-N-naphthylcarbamoyl, N-($C_1$-$C_6$-alkyl)-N-4-methylphenylcarbamoyl, N-($C_1$-$C_6$-alkyl)-N-2-methylphenylcarbamoyl, N-($C_1$-$C_6$-alkyl)-N-4-chlorophenylcarbamoyl, N-($C_1$-$C_6$-alkyl)-N-2-chlorophenylcarbamoyl, N-($C_1$-$C_6$-alkyl)-N-2-methyl-4-chlorophenylcarbamoyl, sulphamoyl, N-($C_1$-$C_6$-alkyl)sulphamoyl, N,N-di-($C_1$-$C_6$-alkyl)sulphamoyl, $C_1$-$C_6$-alkylsulphonyl, phenylsulphonyl, naphthylsulphonyl, 4-methylphenylsulphonyl, 2-methylphenylsulphonyl, 2-chlorophenylsulphonyl, 4-chlorophenylsulphonyl, 2-methyl-4-chlorophenylsulphonyl, or trifluoromethyl;
$R_3$ is cyclohexyl, phenylmethyl, phenylethyl, -phenylhydroxyethyl, phenylpropyl-(2,2), $C_1$-$C_6$-alkyl, or $C_2$-$C_6$-alkenyl, said alkyl and said alkenyl being unsubstituted or substituted by chloro, bromo, hydroxy, methoxy, cyano, acetoxy, aminocarbonyl, carboxy, allyloxy or methoxycarbonyl;
$R_4$ is $C_2$-$C_6$-alkenyl or $C_1$-$C_6$-alkyl, which is unsubstituted or substituted by halogeno, $C_1$-$C_6$-alkoxy, hydroxy, hydroxy-$C_1$-$C_6$-alkoxy, halogenohydroxy, cyano, carboxy, aminocarbonyl, acetyloxy, allyloxy, benzoyloxy, methoxybenzoyloxy or methoxycarbonylbenzoyloxy, cyclohexyloxy, phenyloxy, methoxyphenyloxy, methylphenyloxy, ethylphenyloxy, chlorophenyloxy, cyclohexylphenyloxy, isopropyloxyphenyloxy, phenylphenyloxy, benzylphenyloxy, tetrahydronaphthoxy, benzyloxy, phenylethyloxy, phenylpropyloxy, phenylthio, cyclohexyl, benzyl, phenylethyl, phenylpropyl-(2,2), phenyloxy-$C_1$-$C_6$-alkoxy, naphthyloxy-$C_1$-$C_6$-alkoxy, or phenylaminocarbonyloxy;
$p$ is 0, 1, 2, 3 or 4;
$n$ is 0, 1, 2 or 3;
$X^-$ is an anion; or
ring A is fused to a benzene ring.
2. Dyestuff of claim 1 of the formula wherein
R, R', R'', R''', R$_2$, R$_3$, R$_4$, R$_5$, X$^-$, m, and n have the same meaning as in claim 1; and
R$_6$ is C$_1$-C$_6$-alkyl.

3. Dyestuff of claim 1 of the formula wherein
R$_4$, X$^-$, m, and n are defined as set forth in claim 1;
R$_7$ is methyl, ethyl, propyl or butyl;
R$_8$ is methyl, ethyl, methoxy, ethoxy, chloro, bromo, fluoro, trifluoromethyl, phenoxy, or benzyloxy;
R$_9$ is methyl, ethyl, propyl, butyl, β-chloroethyl, β-hydroxyethyl, β-cyanoethyl, β-bromoethyl, β-acetoxyethyl, allyl, benzyl, β-carboxyethyl, or β-carbonamidoethyl; and
R$_{10}$ is methyl, ethyl, methoxy, ethoxy, fluoro, chloro, bromo, trifluoromethyl, nitrilo, thiocyanato, nitro, carboxyl, aminocarbonyl, aminosulphonyl, acetyl, benzoyl, phenoxy, benzyloxy, carboxylic acid methyl ester carboxylic acid ethyl ester, carboxylic acid phenyl ester, carboxylic acid benzyl ester, methylsulphonyl, ethylsulphonyl or phenylsulphonyl.

4. Dyestuff of claim 3 wherein
R$_4$ is β-hydroxyethyl, β-chloroethyl, n-butyl or benzyl;
R$_7$ is methyl or ethyl;
R$_9$ is methyl and
m and n are zero.

5. Dyestuff of claim 3 wherein R$_9$ is -hydroxyethyl.

6. Dyestuff of claim 5 wherein R$_7$ is methyl or ethyl; and
m and n are zero.

7. Dyestuff of claim 3 of the formula wherein
R$_4$, R$_7$, R$_8$, R$_{10}$, X$^-$, m, and n have the same meaning as in claim 3;
R$_{11}$ is hydrogen or methyl; and
R$_{12}$ is methyl, ethyl, chloromethyl, methoxymethyl, ethoxymethyl, propoxymethyl, butoxymethyl, allyloxymethyl, phenoxymethyl, or phenyl.

8. Dyestuff according to claim 3 of the formula

9. Dyestuff according to claim 1 of the formula

10. Dyestuff according to claim 1 of the formula

11. Dyestuff according to claim 1 of the formula

12. Dyestuff according to claim 1 of the formula
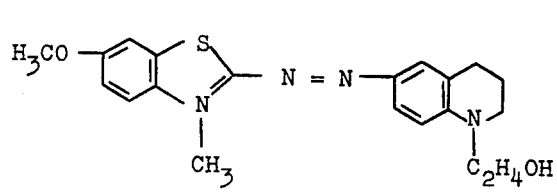
Cl⁻, ZnCl₂
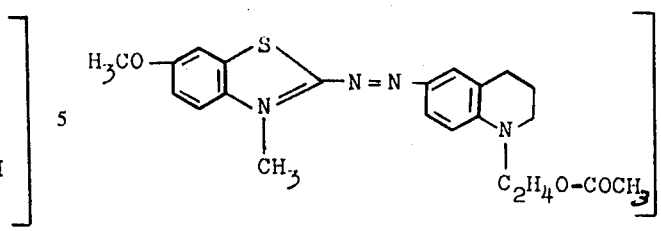
CH₃—O—SO₃⁻
* * * * *